Oct. 8, 1968 J. B. COUVILLON 3,405,369

SYNTHETIC FREQUENCY DIVIDER

Filed Jan. 21, 1964

WITNESSES

Leon J. Taza

James F. Young

INVENTOR

James B. Couvillon

BY Ernest P. Klipfel

ATTORNEY

United States Patent Office 3,405,369
Patented Oct. 8, 1968

3,405,369

SYNTHETIC FREQUENCY DIVIDER

James B. Couvillon, Laurel, Md., assignor to Westinghouse Electric Corporation, East Pittsburgh, Pa., a corporation of Pennsylvania Filed Jan. 21, 1964, Ser. No. 339,280
15 Claims. (Cl. 331—14)

This invention relates to electronic circuitry in general and more particularly to electronic systems of the type in which one signal is phase locked to a reference signal.

It is an object of the present invention, therefore, to provide an improved method and means for phase locking one signal to another signal.

It is another object of the present invention to generate phase locked signals having a frequency which is a predetermined multiple of a reference frequency.

It is still another object of the present invention to provide means for performing synthetic frequency division.

It is still a further object of the present invention to provide apparatus which generates a signal having a frequency which is a non-integer multiple of a reference frequency.

It is yet another object of the present invention to provide a means for generating a signal having a frequency which is a non-integer submultiple of a reference frequency.

It is still a further object of the present invention to generate a phase locked signal having a frequency which is a submultiple of a reference frequency without a substantial deterioration in signal to noise ratio.

Briefly, the above-recited objects are accomplished by providing two signal sources, one a reference source and the other a source of signals which is to be phase locked to the reference source in accordance with the subject invention. The output of the source of signals to be phase locked is compared with a gate signal produced at predetermined intervals and an error signal is generated in accordance with the relative phase or time coincidence thereof to "pull" the frequency and phase of the other source to the reference source. More particularly, a voltage controlled crystal oscillator having a frequency range within a predetermined submultiple of the reference frequency comprises the other source of signals while the reference source is a highly stable fixed frequency oscillator. There is a determination made, when the desired output frequency from the controlled oscillator is chosen, as to how often repetitive crossover points of phase coincidence occur in the respective signals, assuming phase lock exists. A gate signal is generated at the crossover points and the output signal of the crystal oscillator is compared for actual phase coincidence whereupon an error signal is generated in accordance therewith to change both the phase and the frequency, if need be, of the voltage controlled crystal oscillator until a zero error signal occurs.

Other objects and advantages will become more apparent as the following description proceeds when read in conjunction with the accompanying drawings in which.

Figure 1:
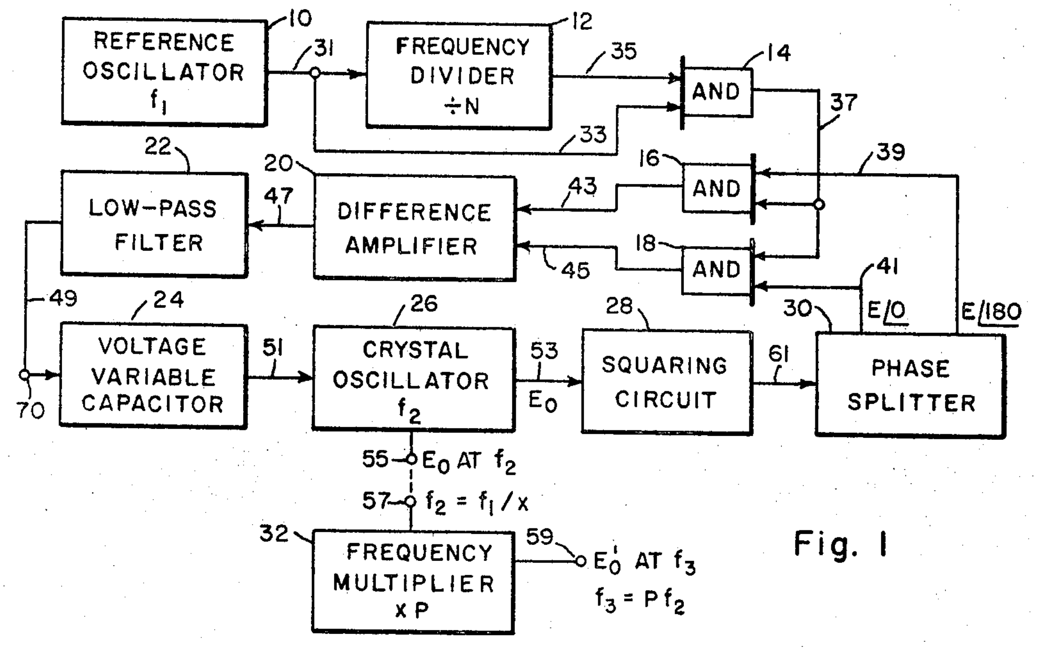
FIGURE 1 is an illustration in block diagrammatic form of the preferred embodiment of the present invention.

Referring to the drawings, and more particularly to FIGURE 1, a signal source shown as a reference oscillator 10 generating a frequency $f_1$ is coupled by means of circuit lead 31 to a frequency divider 12. The output of the frequency divider 12 is fed to a coincidence circuit 14, commonly designated as an AND gate, by means of circuit lead 35. In addition to the lead 35 from the frequency divider 12, the AND gate 14 has an input applied from the reference oscillator 10 by means of circuit lead 33. The output of the AND gate 14 is directed to a second and a third AND gate circuit 16 and 18 by means of circuit lead 37. AND gates 16 and 18 are also provided with inputs from a phase splitter circuit 30 providing signals $E\angle 0$ and $E\angle 180$. These signals are fed to the input of AND gates 18 and 16 by means of circuit leads 41 and 39 respectively. The outputs from AND gates 16 and 18 are applied as inputs to a difference amplifier 20 by means of circuit leads 43 and 45, respectively. The output of the difference amplifier 20 is coupled to a low-pass filter network 22 via circuit means 47 and the low-pass filter network is coupled to a voltage variable capacitor 24 by means of the circuit lead 49 connected to terminal 70. The voltage variable capacitor 24 is coupled to a crystal oscillator circuit 26 by means of circuit lead 51. The output signal $E_0$ from the crystal oscillator 26 appears at terminal 55 and has a frequency $f_2$. A portion of the output signal $E_0$ from the crystal oscillator 26 is fed to a squaring circuit 28 by means of circuit lead 53 where the output signal is shaped to provide a square wave at the output thereof having a frequency $F_2$ and in phase with $E_0$. The square wave circuit output is then fed to the phase splitter circuit 30 by means of circuit lead 61. When desirable, a frequency multiplier circuit 32 can be coupled to the output terminal 55 of the crystal oscillator 26 through terminal 57. The output signal $E_0'$ then will appear at terminal 59 of the frequency multiplier circuit 32 at a frequency $f_3$.

The reference oscillator 10 can be of any well-known design which is capable of providing a stable, non-varying output of a predetermined frequency. An example of such a reference oscillator can be found in A Handbook of Selected Semi-Conductor Circuits, NObsr 73231, NavShips 93484, page 5–24. The frequency divider 12 is preferably a digital type counter providing a division by a factor N. Such a counter circuit is well-known in the art and can be a matter of choice. A typical example of a digital counter circuit is shown in the M.I.T. Radiation Laboratory Series, volume 19, page 611, Figure 17.8.

A typical coincidence or AND gate is illustrated in A Handbook of Selected Semi-Conductor Circuits, supra, at page 7–2, Figure 7–0.1. Illustrations of a difference amplifier 20 can be found in the Electronic Designer's Handbook, McGraw-Hill Book Company, Inc., 1957, page 3–61, Figure 3.59. The crystal oscillator circuit 26 is more fully illustrated in FIGURE 3 and will be explained subsequently. The squaring circuit 28 may be of any conventional design; however, one example of such a circuit is known as a Schmitt trigger circuit and is illustrated in the A Handbook of Selected Semi-Conductor Circuits, supra, at page 6–63, circuit 6–18. The phase splitter circuit 30 is commonly referred to as a paraphase amplifier or a split load phase inverter. An example of such a circuit is shown in the Electronic Designer's Handbook, supra, page 3–65, Figure 3.61.

In operation, the subject invention preselectively produces a gate signal in accordance with the signal from the reference oscillator 10 and compares it with the waveforms generated from the crystal oscillator 26 in order to produce an error signal in the difference amplifier 20 to shift the phase and frequency of the crystal oscillator 26 by means of the voltage variable capacitor 24 until phase lock occurs and the error signal is reduced to zero. In order to selectively produce the required gate signal, it is first necessary to determine where repetitive matching of crossover points (phase coindence) occur between the waveforms of the signals generated by the reference oscillator 10 and the crystal oscillator 26, assuming that phase lock or time coincidence presently exists.

Between phase coincidence points, there exists a certain number of cycles of the reference waveform. Since only the cycle which is in phase coincidence with the particular cycle of the crystal oscillator waveform is of interest for comparison purposes, the reference oscillator frequency $f_1$ is divided by a number N equal to, or directly proportional to, the number of cycles of the reference waveform between repetitive phase coincidence points, to obtain a new frequency $f_1/N$.

One of various methods of determining N consists in reducing the ratio $f_1/f_2$ to its lowest terms, where $f_1$ is the reference frequency and $f_2$ is the crystal oscillator frequency, and if the reduced ratio contains a decimal, a multiplication by some multiple of ten is performed to eliminate the decimal. The largest number common to both terms of the modified ratio is then determined and is divided into the numerator of the modified ratio to thereby obtain the factor N.

By way of example, if the reference frequency is 40 megacycles per second (mc.) and the desired crystal oscillator frequency is 15 mc. the ratio of the two frequencies, 40/15 may, by a division of both terms by 5 be reduced to 8/3. Since there is no decimal, there is no need to multiply by a power of 10 and the highest whole number common to both numerator and denominator of the modified ratio may be determined. That number is 1 and since the numerator 8 divided by 1 is 8, N equals 8. Therefore, every eighth cycle of the 40 mc. wave will be provided and will have a phase coincidence with every third cycle of the 15 mc. wave and, in essence, the phase comparison means compares two different frequencies, (1) the 15 mc. wave and (2) the 40 mc. wave divided by N, that is 5 mc.

As another example consider the situation wherein the reference frequency is 7 cycles per second (c.p.s.) and the desired crystal oscillator frequency is 7.1 c.p.s. The ratio 7/7.1 cannot be reduced. Multiplication of both terms by 10 results in a ratio of 70/71 and the highest whole number common to both numerator and denominator of the modified ratio is 1. The numerator 70 divided by 1 is 70 therefore N equals 70. If the desired crystal oscillator frequency were 7.5, the ratio of 7/7.5 is equivalent to 70/75 which reduces to 15/14 yielding a highest common number of 1 and an N of 15.

As another example, if the reference frequency were 9 mc. and the desired crystal oscillator frequency 30.2 kc. the ratio of the two frequencies would be $$\frac{9\times 10^6}{.0302\times 10^6}$$

Canceling the powers of 10 and eliminating the decimal point yields a ratio of 90,000/302 which reduces to 45,000/151 and N in that case would be 45,000.

In the above examples, the reference oscillator frequency was divided by some number N to provide a comparison signal. Conversely, the crystal oscillator frequency may be divided by a number N equal to the number of cycles of the crystal oscillator waveform between phase coincidence points, to provide a waveform for comparison with the reference oscillator.

Figure 2:
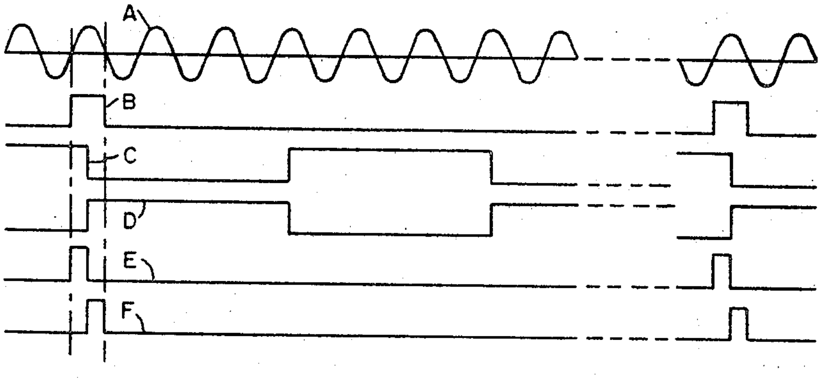
FIG. 2 is an illustration of selected waveforms helpful in understanding the subject invention.

The output of divider 12 is fed as an input to the AND gate 14 and an input to the AND circuit 14 is also provided from the reference oscillator 10. An output will occur from the AND gate 14 every Nth cycle of the reference oscillator because coincidence then occurs between the output of the frequency divider 12 and the signal generated by the reference oscillator 10. This is illustrated graphically in FIGURE 2 where curve A is a waveform of the output of the reference oscillator 10. Curve B is a waveform illustrative of the output from the AND gate 14 indicating that the output ($\div$N) of frequency divider 12 when it is coincident with the output of the reference oscillator 10 will produce an output on circuit lead 37.

A portion of the signal $E_0$ generated by the crystal oscillator 26 is fed into the squaring circuit 28 by means of the circuit lead 53 for providing a much better definition of the crossover points, that is, a square wave has a crossover point which is characterized by a comparatively rapid crossover from one polarity to another as compared to a sinusoidal waveform. The signal appearing on circuit lead 61 therefore is preferably a square wave having a frequency equal to the crystal oscillator frequency $f_2$. The phase splitter circuit 30 develops two output signals $E\angle 0$ and $E\angle 180$ degrees from the square wave signal appearing at circuit lead 61. The two output signals $E\angle 0$ and $E\angle 180$ have a frequency equal to $f_2$ and are coherent with the portion of the crystal oscillator signal $E_0$ appearing at circuit lead 53. The two output signals $E\angle 0$ and $E\angle 180$ from the phase splitter 30 are applied respectively to AND circuits 18 and 16 which simultaneously have applied thereto the gate signal B (FIGURE 2) from gate 14. The signals $E\angle 0$ and $E\angle 180$ are illustrated by the curves C and D respectively of FIGURE 2. When coincidence occurs between the signal $E\angle 0$ (curve C) and the gate signal B, AND gate 18 provides an output represented by a curve E of FIGURE 2 on circuit lead 45. AND gate 16, on the other hand, provides an output signal illustrated as curve F of FIGURE 2 on circuit lead 43 when signal $E\angle 180$ (curve D) and the gate signal (curve B) are coincident. The two output signals from AND circuits 18 and 16 represented by curves F and E respectively are applied as inputs to the difference amplifier 20 which compares the relative energies between the two signals E and F and produces an output error signal on lead 47 which is a function of the difference in the two energies. This error signal is indicative of the position of the signals represented by curves C and D with respect to the center of the gate signal, curve B. Any offset of the crossover points of curves C and D with respect to the center of curve B will provide unequal areas under the curves E and F creating an error signal. The error signal appearing at lead 47 is fed to the low-pass filter 22 to remove transients and other spurious signals. The error signal is next applied to the voltage variable capacitor 24 which is responsive to the average value of the error signal and changes its capacity in accordance therewith. A change in the capacity affects the resonant frequency of the crystal oscillator 26 by an amount in the proper direction to bring curves C and D substantially in the center of curve B and maintain this state. It will be apparent therefore that since curve B is generated at predetermined times in coincidence with curve A that the locking of curves C and D to the gate signal, curve B, from gate 14, curve B will establish the required phase lock of the frequency $f_2$ to the reference frequency $f_1$.

The present invention therefore develops an output signal $E_0$ having a frequency $f_2$ which is phase locked to the reference frequency $f_1$. Since the frequency $f_2$ is locked to the frequency $f_1$, the frequency $f_2$ can be considered to be synthetically divided from the reference frequency $f_1$. In all respects, the frequency $f_2$ appears to be a division of $f_1$; however, there is not a direct frequency division such as digitally dividing from one frequency to another by means of a scale of N counter. The subject invention merely locks a voltage controlled crystal oscillator having a frequency $f_2$ such that it is slaved to the reference oscillator 10. In this manner, the frequency $f_2$ can not only be a whole number submultiple of the reference frequency $f_1$, but also a non-integer submultiple of $f_1$. It is the latter application to which the invention is particularly adapted. The frequencies are simply phase locked together in an improved manner giving the appearance that the frequency $f_2$ was generated directly from the reference oscillator 10.

Figure 3:
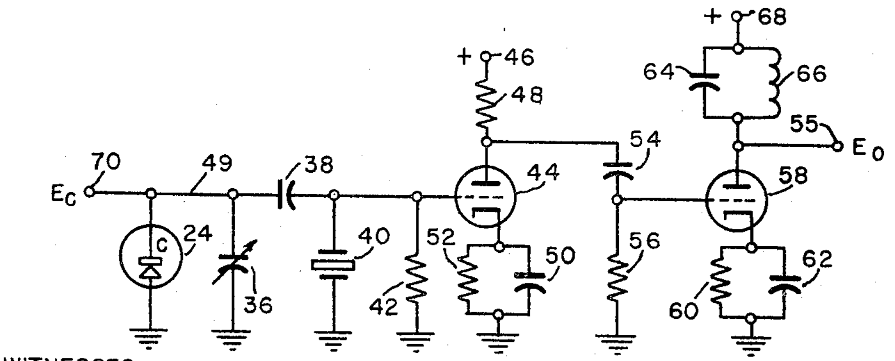
FIG. 3 is a schematic diagram typical of a voltage controlled oscillator utilized in the subject invention.

FIGURE 3 is a schematic diagram illustrative of the crystal oscillator 26 and the voltage variable capacitor 24. The voltage variable capacitor 24 is illustrated as a capacitive diode and is normally comprised of semiconductor material. The cathode electrode is connected to terminal 70 by means of a circuit lead 49. The anode electrode of the diode 24 is returned to a point of reference potential illustrated as ground. Across the capacitive diode 24 is a variable capacitor 36. The variable capacitor 36 is a trimmer capacitor, which in combination with the capacitive diode 24 and capacitor 38 is capable of varying the resonant circuit of the crystal 40. The oscillations produced by the crystal 40 are coupled to the grid electrode of an amplifier tube 44 which increases the amplitude or gain of the signal applied thereto and is coupled to a second vacuum tube 58 by means of the coupling capacitor 54. The second stage of amplification provided by electron tube 58 acts as a buffer amplifier and has a load comprised of a tuned circuit including capacitor 64 and inductor 66 coupled in its plate circuit.

The error voltage appearing on circuit lead 49 of FIGURE 1 as a result of the output of the difference amplifier 20 being fed to the low-pass filter network 22 is applied to terminal 70. The voltage at terminal 70 changes the conductivity of the diode 24 resulting in a change of capacitance of the diode. The diode 24 is chosen so that the change of capacitance across the capacitive diode 24 is sufficient to pull the frequency of oscillation of the crystal a desired amount. The amplifier tubes 44 and 58 raise the output level of the signal to a predetermined level for utilization.

When it is desirable to provide an output frequency $f_3$ which is greater in magnitude than the frequency $f_1$, it is a simple matter of coupling the output signal $E_0$ at frequency $f_2$ appearing at terminal 55 to the input terminal 57 of a suitable frequency multiplier 32 which would then increase the frequency by a factor of P. Then an output frequency $F_0'$ is available which has a frequency $f_3$ which is equal to $P \times f_2$.

While there has been shown and described what is presently considered to be the preferred embodiment of the invention, modifications thereto will readily occur to those skilled in the art. For example, when desirable, it is possible to provide a gate signal from gate 14 which is a portion of the sinusoidal signal from the reference oscillator rather than the output from the frequency divider circuit. Also, where the frequencies $f_2$ and $f_1$ are of the same magnitude, the squaring circuit 28 could be eliminated. It is not desired therefore that the invention be limited to the specific arrangement shown and described and it is to be understood that all equivalents, alterations, and modifications within the spirit and scope of the invention are herein meant to be included.

I claim as my invention:

1. Apparatus for producing synthetic frequency division of an electrical signal comprising:

(A) a first oscillator for providing a first oscillator signal;

(B) a second oscillator for providing a second oscillator signal;

(C) frequency divider means coupled only to said first oscillator for providing a comparison signal having a frequency which is equal to $f/N$, where $f$ is the frequency of said first oscillator and N is a whole number;

(D) said whole number N being directly proportional to the number of cycles of said first oscillator signal between phase coincidence crossover points of said first and second oscillator signals;

(E) said frequency $f/N$ being different than the frequencies of both said first and second oscillators; and (F) circuit means responsive to said comparison signal and said second oscillator signal, with respect to time coincidence, for controlling said second oscillator signal.

2. Apparatus according to claim 1 wherein:

(A) the first oscillator is a stable reference oscillator; and (B) the second oscillator is a variable controlled oscillator.

3. Apparatus according to claim 1 wherein:

(A) the number N is exactly equal to the number of cycles of the first oscillator signal between phase coincidence crossover points of the first and second oscillator signals.

4. Apparatus according to claim 1 wherein the frequency divider means includes:

(A) a frequency divider circuit;

(B) a coincidence gate having first and second inputs;

(C) the output of said first oscillator being connected to a first of said inputs; and (D) the output of said frequency divider circuit being connected to the other of said inputs.

5. Apparatus according to claim 1 wherein the circuit means includes:

(A) a phase splitter circuit responsive to the output of the second oscillator for providing first and second oppositely phased signals;

(B) comparison means responsive to the comparison signal and said oppositely phased signals for generating an error signal; and (C) means responsive to said error signal for correcting the frequency of the second oscillator.

6. Apparatus according to claim 5 wherein the comparison means for generating an error signal includes a low-pass filter network.

7. Apparatus for generating a signal which is a non-integer submultiple of a reference signal, comprising in combination: a source of reference signals having a predetermined reference frequency; a crystal controlled oscillator including means for controlling the frequency thereof and producing an output signal having a frequency which is substantially equal to a predetermined non-integer submultiple of said reference frequency; a frequency divider circuit coupled to said source of reference signals, providing a first signal having a selected frequency division from said reference frequency in accordance with predetermined crossover points between signals from said source of reference signals and said crystal controlled oscillator; first coincidence means coupled to said source of reference signals and said frequency divider circuit for generating a gate signal when time coincidence occurs between said reference signals and said first signal; second coincidence means coupled between said first coincidence means and said crystal controlled oscillator for receiving said gate signal and a portion of said output signal from said crystal controlled oscillator to generate a plurality of second signals determined by the phase relationship between said gate signal and said output signal; circuit means responsive to said plurality of second signals coupled to said second coincidence means for producing an error signal in accordance with said phase relationship; and circuit means for coupling said error signal to said means for controlling said crystal controlled oscillator for altering said output frequency thereof until phase lock occurs between said source of reference signals and said crystal controlled oscillator.

8. Apparatus for producing synthetic frequency division of an electrical signal comprising in combination: a source of reference signals having a predetermined reference frequency; a voltage controlled crystal oscillator including control means for having its frequency changed in accordance with a control signal and providing an output frequency which is equal to a predetermined non-integer submultiple of said reference frequency; frequency divider means coupled to said source of reference frequencies providing a first signal having a selected frequency division from said reference frequency; a first coincidence circuit coupled to said source of reference signal and said frequency divider means for generating a gate signal when coincidence occurs between said reference signals and said first signal; a second and a third coincidence circuit adapted to receive said gate signal from said first coincidence circuit; circuit means for delivering signals from said voltage controlled crystal oscillator to said second and third coincidence circuit, said last mentioned signals being in phase and substantially 180 degrees out of phase with respect to one another; difference amplifier means coupled to said second and third coincidence circuit for generating said control signal in accordance with the phase relationship between said gate signal and said signals from said voltage controlled crystal oscillator; and circuit means for coupling said control signal to said control means of said controlled oscillator for changing the frequency thereof to effect phase lock between said source of reference signals and said voltage controlled crystal oscillator.

9. Electrical apparatus as set forth in claim 8 wherein said control means comprises a voltage variable capacitor.

10. Apparatus for producing synthetic frequency division of an electrical signal comprising in combination: a source of reference signals having a predetermined reference frequency; a crystal controlled oscillator producing an output signal having an output frequency which is a predetermined submultiple of said reference frequency; control means operably connected to said crystal controlled oscillator for changing the resonant frequency thereof in accordance with a control signal applied thereto; a frequency divider circuit coupled to said source of reference signals providing signals having a preselected frequency division with respect to said reference frequency, said signals having said preselected frequency division in accordance with predetermined crossover points between signals from said source of reference signals and said crystal controlled oscillator; first gate circuit means coupled to said frequency divider circuit and said source of reference signals for generating a gate signal when time coincidence occurs between said reference signals and said signals from said frequency divider circuit; a phase splitter network coupled to said crystal controlled oscillator for producing signals which are in phase and substantially 180 degrees out of phase with said output signal; second and third gate circuit means adapted to receive said gate signal and signals from said phase splitter network in phase and 180 degrees out of phase respectively with respect to said output signal from said crystal controlled oscillator; difference amplifier means coupled to said second and said third gate circuit means for receiving respective output signals therefrom for producing an error signal in accordance with the energy difference in said output signals for controlling said crystal controlled oscillator by means of said control means; and circuit means operably connected between said difference amplifier means and said control for directing said error signal thereto wherein said output frequency of said crystal controlled oscillator is locked in phase relationship with said source of reference signals.

11. Apparatus as set forth in claim 10 wherein said control means comprises a semiconductor diode.

12. Apparatus as set forth in claim 10 where said circuit means coupled between said difference amplifier and said control means comprises a low-pass filter.

13. Apparatus as set forth in claim 10 wherein said control means comprises a voltage variable capacitor.

14. Apparatus as set forth in claim 10 wherein said first, second and third gate circuit means comprises an AND gate.

15. Apparatus as set forth in claim 10 wherein said frequency divider circuit comprises a digital frequency divider.

References Cited

UNITED STATES PATENTS

| | | | |
|---|---|---|---|
| 2,521,058 | 9/1950 | Goldberg | 331—27 |
| 3,130,376 | 4/1964 | Ross | 331—18 |
| 3,217,267 | 11/1965 | Loposer | 331—17 |

JOHN KOMINSKI, *Primary Examiner.*